US007085843B2

(12) United States Patent
Buddhikot et al.

(10) Patent No.: US 7,085,843 B2
(45) Date of Patent: Aug. 1, 2006

(54) METHOD AND SYSTEM FOR DATA LAYOUT AND REPLACEMENT IN DISTRIBUTED STREAMING CACHES ON A NETWORK

(75) Inventors: Milind M. Buddhikot, Cliffwood, NJ (US); Katherine H. Guo, Eatontown, NJ (US); Subhash Suri, Santa Barbara, CA (US); Youngsu Chae, Norcross, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 951 days.

(21) Appl. No.: 09/823,053

(22) Filed: Mar. 30, 2001

(65) Prior Publication Data

US 2002/0029282 A1    Mar. 7, 2002

Related U.S. Application Data

(60) Provisional application No. 60/217,921, filed on Jul. 13, 2000.

(51) Int. Cl.
*G06F 15/16* (2006.01)
(52) U.S. Cl. .......................... 709/231; 725/87
(58) Field of Classification Search ................ 709/205, 709/217, 231, 236; 705/14; 711/133; 725/87; 707/7
See application file for complete search history.

(56) References Cited

U.S. PATENT DOCUMENTS

| | | | |
|---|---|---|---|
| 6,173,287 B1* | 1/2001 | Eberman et al. | 707/102 |
| 6,385,693 B1* | 5/2002 | Gerszberg et al. | 711/118 |
| 6,463,508 B1* | 10/2002 | Wolf et al. | 711/133 |
| 6,496,980 B1* | 12/2002 | Tillman et al. | 725/90 |
| 6,700,933 B1* | 3/2004 | Wu et al. | 375/240.16 |

* cited by examiner

*Primary Examiner*—John Follansbee
*Assistant Examiner*—Mohammad Siddiqi

(57) ABSTRACT

A system and method for segmenting, distributing and replacing streaming multimedia clips in a network system including at least one origin server connected to a plurality of streaming caches via an interactive distribution network, such as the Internet. The at least one origin server stores a plurality of streaming multimedia clips in an associated memory and segments the clips into a plurality of data segment of exponentially increasing size; the origin server then distributes the plurality of data segments to the plurality of streaming caches where each streaming cache decides whether to store or discard each segment in accordance with a predefined probability. Another aspect of the invention involves replacing stored data segments at each of the plurality of streaming caches as needed. In one embodiment, a hotness rating is computed for each streaming multimedia clip stored in an SC. Clips are replaced as needed based on their hotness rating relative to other clips. In a second embodiment, a potential function is computed for each segment stored in an SC. Segments are replaced as needed based on their potential function value relative to other stored segments.

16 Claims, 6 Drawing Sheets

METHOD AND SYSTEM FOR DATA LAYOUT AND REPLACEMENT IN DISTRIBUTED STREAMING CACHES ON A NETWORK

PRIORITY

The present application claims priority to a U.S. Provisional Application filed on Jul. 13, 2000 by Buddhikot et al. having U.S. Provisional Application No. 60/217,921; the contents of which are incorporated herein by reference.

BACKGROUND OF THE INVENTION

1. Field of the Invention

The present invention relates to network systems, and particularly to public network systems, such as the Internet. More particularly, the invention relates to a method and system for the caching of streaming multimedia data (e.g., audio and video data) from a content provider over a network to a client's computer.

2. Description of the Related Art

Computer networks such as the Internet are increasingly being used to transmit multimedia data (e.g., audio and video data). The enormous increase in traffic from transmitting such data has severely strained the Internet infrastructure. The data congestion problem is only expected to grow in the future as new multimedia data and new media rich Internet services such as e-commerce become widespread. Before the recent explosion of transmitting multimedia data over the Internet, data caching has become the preferred solution to address the problem of network congestion. Data caching attempts to move web content closer to the end-user and thus, minimize network and web server load, thereby improving the performance perceived by the end-user.

Data caching has been extensively implemented on the Internet to reduce network load (i.e., bandwidth consumption), server load, and response time. Existing data caching systems, typically cache entire web documents, such as HTML documents and images, for example, and attempt to keep the documents and images consistent with the origin server.

Current data caching systems are restrictive in that they only support static web clips such as HTML documents or images. Static web clips are typically small and as such are always cached in their entirety. Current caching methods do not adequately support streaming multimedia data, such as video and audio streaming media objects. Streaming multimedia data like video objects, for example, are usually too large to be cached in their entirety. With the recent proliferation of audio/video content on web sites, it is imperative that such data caches provide efficient support for streaming media. However, the aforementioned data caches treat multimedia (i.e., audio/video) clips as regular web objects, storing them in their entirety. Treating multimedia clips as regular web objects will prove to be adequate only in the short term as the size of multimedia clips on the web currently is relatively small. In the near future, however, faster Internet access technologies such as XDSL, DSL, VDSL and cable-modems will further enable the transmission of high-bandwidth, high resolution media clips that are much longer in duration than present day media clips. It will no longer be cost effective to cache such large media clips in their entirety.

The size of present day streaming media clips is typically at least an order of magnitude or two larger than that of a static web object, and therefore, do not lend themselves to be cached in their entirety. For example, a single, two hour long MPEG-2 movie requires about 4.5 GB of hard disk space. Given a fixed investment on buffer space, it is apparent that only a few media clips can be stored at a cache, and therefore, the hit ratio and the efficiency of the cache is limited. Given that caches have finite disk space, it is not feasible to statically store more than a few complete media clips. If there are several simultaneous requests for different media clips, it is easy to show that the cache will be busy replacing one media clip with another resulting in significant performance degradation.

One proposed solution to this problem is to break media clips into smaller segments and distribute those segments in a system of caches connected by a network. This approach has several disadvantages as described below. The approach has been extensively studied and employed in disk arrays such as "RAID: High performance, Reliable Secondary storage," ACM Computing Surverys, June 1994, Chen, P., et al., and distributed cluster based video-on-demand servers, such as, Bolosky, W., et al., "The Tiger Video File-server," Proceedings of NOSSDAV96, pp. 97–104, Zushi, Japan, Apr. 23–26, 1996, and Buddhikot, M., et al., "Design of a Large Scale Multimedia Storage Server," Journal of Computer Networks and ISDN Systems, pp. 504–517, December 1994. Several research efforts such as Project MARS, Buddhikot, M., et al., "Design of a Large Scale Multimedia Storage Server," Journal of Computer Networks and ISDN Systems, pp. 504–517, December 1994; Microsoft TIGER filesystem, Bolosky, W. et al., "The Tiger Video File-server," Proceedings of NOSSDAV96, pp. 97–104, Zushi, Japan, Apr. 23–26, 1996; and Server Array, Bernhardt, C. et al., "The Server Array: A Scalable Video Server Architecture," High-Speed Networks for Multimedia Applications, Academic Press, 1996, for example, have addressed the problems of distributed or striped layouts. However, their primary focus has been on video servers constructed using disks or tightly coupled clusters. Also, they focus on optimizing data layouts for high concurrency and balanced operation of clusters under normal playout and interactive playback operations such as fast-forward and rewind. They do not address configurations defining loosely coupled caching system as taught by the present invention.

FIG. 1 describes a basic model of a distributed cache including an origin server which stores thereon a plurality of multimedia clips. The origin server is connected to a plurality of streaming caches (SCs) in the network. Each SC services a plurality of multimedia-capable clients (MCs) in the network which request one or more of the multimedia clips.

With reference to a representative multimedia clip stored at the origin server, one prior art data layout approach, referred to herein as a simplistic approach, is to cache the multimedia clip in its entirety at each SC in the network. This data layout approach is problematic in that it is expensive to implement and not scalable with large numbers of clips. An alternative approach, referred to as a distributed data layout approach, is to break the multimedia clip into small segments of fixed or variable duration and distribute the segments among different SCs in the network thereby effectively constructing a distributed cache. In the distributed data layout approach, there are two models for constructing the distributed cache:

Origin Server Aware (OSA)—in this model, the origin server is aware of the SCs in the network and based on its knowledge of clip popularity (i.e., how often a clip is requested) decides how the clip should be distributed among all or a subset of the SCs. This approach is easier to implement across SCs supplied from different vendors as long as there is a standardized interface between the SCs and the origin server. However, it is often the case that the origin server is owned by a content provider and not by the ISP that operate the SCs. Therefore, it is not convenient to make the origin server aware of data distribution.

Origin Server Transparent (OST)—In this model, the origin server is unaware of how the clips are stored among the SCs which collectively define the distribution set. Data is distributed in small units the size of which can be unrelated to the actual data layout units. It is assumed that for every clip, each SC is aware of the number of SCs in the distribution set that stores the constituent segments of the clip. A simple state distribution protocol such as Internet Caching Protocol can be enhanced to exchange this information.

It is assumed that in both models the segments which comprise the multimedia clip are distributed to the SCs in the network in successive rounds where the number of rounds equals the number of segments in the clip. In each round, each segment of the clip is cached at one or more of the SCs in the network. When a client attempts to playback the clip, the client's designated SC provides information to the client regarding each SC that stores one or more segments of the clip. Playback software resident at the client then forms a playback schedule consisting of a list of SCs that need to be visited to playback the clip. Thus, the collection of SCs which defined the distribution set act as a single loosely coupled streaming cache.

Three performance metrics are now defined in the context of the OSA and OST models, discussed above, to assess the relative merits of the prior art data layout (i.e., distribution) schemes and the data layout scheme of the present invention.

Metric 1—Storage—It is assumed that each media clip stored at the origin server is of length L and it is further assumed that there are K streaming caches (i.e., SCs) in the network. In the simple storage scenario, discussed above, in which each SC caches the entire media clip, a total storage requirement for each clip would equal {L * K}. For the distributed data layout approach, discussed above, which stripes the segmented clips on K caches, a smaller amount of storage is required and in addition, this approach supports a larger number of concurrent requests.

Metric 2—Playback start-up latency—The playback start-up latency is an important metric for streaming caches and servers, and is defined as the time it takes for the stream playback to start from the time the client request is issued. When a clip is stored in its entirety at the closest cache in the simple storage scenario, the start-up latency is minimal. It is desirable that a distributed data layout preserves this property.

Metric 3—Number of switch-overs—When a client receives stream data from an SC, the stream is switched to successive SCs in the distribution set as the playback progresses. Such switch-overs have an associated cost in the form of latency for signaling and buffering the data from latter SCs in sequence and can result in a potential break in the playout. It is desirable to limit the number of such switch-overs in a distributed data layout.

A primary goal for designing a data layout scheme is to balance the trade-offs between the three parameters discussed above. A need exists for a system and method for enhancing current caching systems to support streaming multimedia distributed over a loosely coupled caching system which balances the trade-offs between the three parameters discussed above.

SUMMARY OF THE INVENTION

The present invention provides a scalable, distributed, caching system that advantageously reduces startup latency, that requires less storage than known caching systems, and that reduces the average number of switch-overs.

In accordance with the present invention, a segmentation method is provided which divides a multimedia clip (i.e., streaming audio and/or video) into a plurality of segments of exponentially increasing size for distribution to one or more streaming caches in the network. In a preferred embodiment, the segments increase in size exponentially, starting with the second segment, until a predetermined threshold segment size is reached. At that point, the inventive segmentation method divides the remainder of the multimedia clip into constant sized segments of a predetermined size.

According to one feature of the segmentation method of the present invention, the probability of a streaming cache (SC) storing a particular segment of a media clip varies in inverse proportion to the segment size. That is, smaller sized segments closer to the beginning of the media clip are stored with a higher probability at each SC, and larger sized segments closer to the end of the media clip are stored with a lower probability. As a consequence, later (i.e., larger sized) segments of the media clip are distributed to fewer SCs in the network and earlier segments are distributed to a higher number of SCs in the network.

In accordance with another aspect of the invention, a multimedia clip distribution method is provided which distributes the segments of a media clip among the distribution set of SCs in the network. One objective of the present invention is store all of the segments of a media clip within the distribution set of caches so that user requests for a multimedia clip can be served entirely from the distribution set without involving the origin server.

In accordance with another aspect of the invention, a cache replacement method is provided which replaces segments and clips from a cache which ensures that a cache can efficiently store future streams. The inventive replacement method ensures that the number of copies of a data segment of a particular media clip is directly proportional to the clip's popularity. Clip hotness rating and segment hotness rating metrics are computed and used to determine which segments to replace.

Advantages of the segmentation/distribution method of the present invention include, reduced startup latency by storing earlier segments of a clip with a higher probability at each SC; reduced storage by not storing each segment with the same probability; and a reduction in the average number of switch-overs by using segments of exponentially increasing size.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

Figure 1:
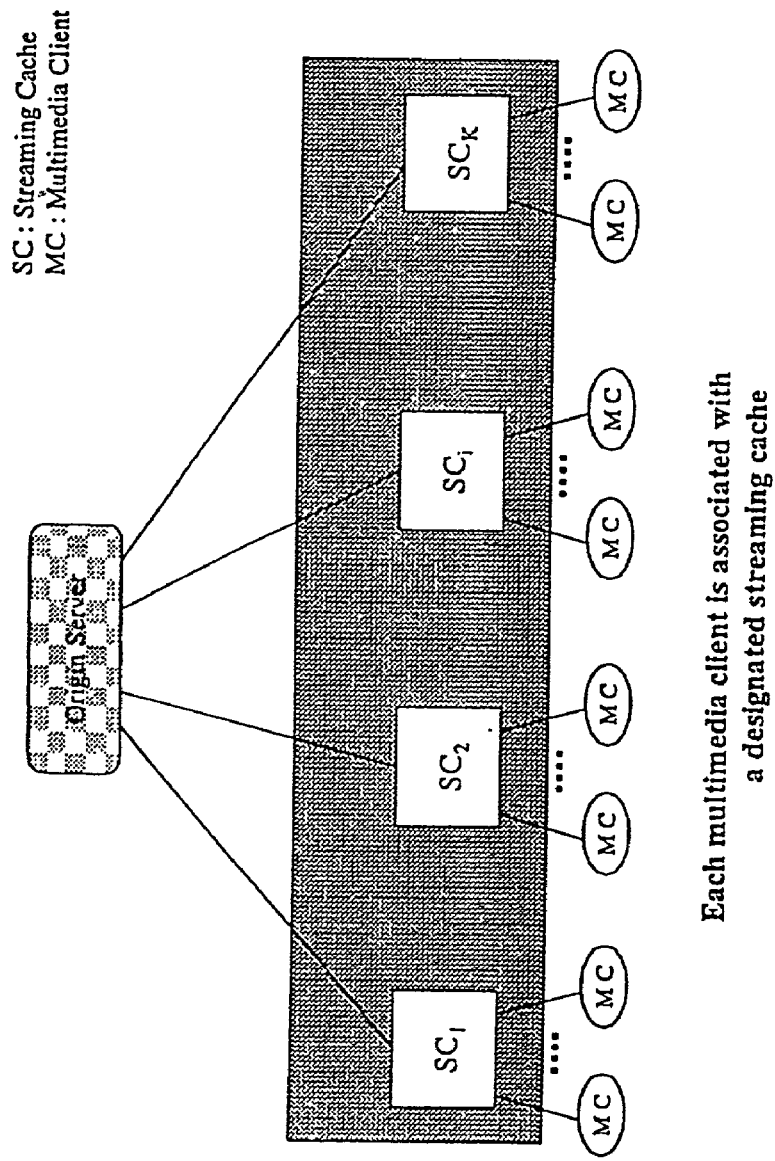
FIG. 1 is an illustration of a distributed cache.

To more fully appreciate the segmentation/distribution/replacement method of the present invention, it is instructive to provide a general understanding of access patterns of streaming media over a network.

At present, there is a lack of understanding concerning access patterns of streaming media on global networks such as, for example, the world wide web. In lieu of such understanding, a Zipf distribution is often used to model these access patterns. Given a set of media clips with different popularity rankings, where the popularity ranking is modeled by a popularity rank r, Zipf's law relates the probability of access to the popularity of the object. A more popular media clip would have a lower rank number, and conversely a less popular clip will have a higher rank number. Specifically, given an object with popularity rank r, the probability p that a new request accesses this object is inversely proportional to r. That is, $$p = K(1/r) \quad (1)$$

where K is a constant.

Equation (1) represents a general equation for describing access patterns of streaming media over a network. Equation (2) generally describes the local popularity of each clip (i.e., the clip's hotness). That is, each SC in the network measures the local clip hotness rating as:

Local Clip Hotness Rating (LCHR)=Total number of client requests for a media clip Time span over which the requests are received at the SC   Eq. (2)

In addition to computing the LCHR at each SC, the origin server computes a Global Clip Hotness Rating (GCHR) by accumulating the local LCHR values computed at each SC. The GCHR is a macro-metric that is a measure of the popularity of the entire clip relative to all other clips, as measured on a network scale.

In the context of a distributed layout, if all requests are always for entire media clips, then the GCHR is adequate to reflect the popularity of the clip. However, in actual practice, requests for segments in the beginning of clips are more frequent than the ones for later segments. In a distributed layout, because one or more segments are stored at each SC, and not the entire clip as is true with the replication scheme, it is necessary to account for segment popularity in addition to clip popularity. Accordingly, a micro-metric referred to as a Local Segment Hotness Rating, (LSHR) is defined. The LSHR records the total number of accesses for each segment of the clip over a fixed time window. Each SC keeps track of its local segment hotness rating (LSHR), for each stored segment. Analogous to the GCHR rating, the origin server sums up the LSHR values computed at each SC to compute a Global Segment Hotness Rating (GSHR) for each clip.

The inventive data distribution and replacement method is now described in the context of the preliminary definitions and metrics described above. The inventive distribution/replacement method is a method for distributing large amounts of data, such as streaming audio and video data, over an electronic network, such as the Internet. The method generally comprises first segmenting a media clip into a number of segments of exponentially increasing size, and then distributing the segments among a distribution set made up of K co-operating streaming caches (SCs) located throughout the network. The details of segmentation and distribution in accordance with the inventive method are described below.

Segmentation

Conventional data distribution schemes typically divide a media clip into equal sized segments for distribution in a network. By contrast, the inventive segmentation method divides a media clip into segments of exponentially increasing size under certain constraints to be discussed below.

In accordance with one embodiment, a media clip is divided into exponentially increasing sized segments, starting with the second segment of the clip. Successive segments of a media clip increase exponentially in size starting with the second segment of the clip until a threshold segment size is reached, at which point the remainder of the clip is divided into equal-sized segments of a predetermined size.

The exponential increase in segment size is now described for a media clip of some arbitrary length L, where L defines units of time, the size of the first two segments of the clip are computed as:

$$\text{Size of } 1^{st} \text{ and } 2^{nd} \text{ segment} = \delta = L/2^{N-1} \quad (3)$$

where N represents the number of segments that the media clip will be divided into and $\delta$ represents an initial segment size. The size of the third segment is computed as:

$$\text{Size of } 3^{rd} \text{ segment} = 2 * \delta = L/2^{N-2} \quad (4)$$

Generalizing the above, the size of the i-th segment (where i=1 ... N) of the media clip is computed as:

$$\text{Size of i-th segment} = 2^{i-2} * \delta = L/2^{N+1-i} \quad (5)$$

Equation (5) describes how the segment size increases exponentially for successive segments of the media clip (i.e., with increasing index, i).

As an example of the inventive segmentation method, assume a media clip of length L (e.g., L=16) is divided into 4 segments (i.e., N=4). The size of each segment of the media clip may be computed in accordance with equation (3). Table I illustrates that the segment size increases exponentially, starting with the second segment (e.g. from 2 to 4).

TABLE I

| Segment Index (i) | Segment Size as a function of the length of the media clip, L | Segment Size as a function of $\delta$ where $\delta = L/2^{N-1}$ |
|---|---|---|
| 1 | L/8 = 16/8 = 2 | $\delta = 2$ |
| 2 | L/8 = 16/8 = 2 | $\delta = 2$ |
| 3 | L/4 = 16/4 = 4 | $2 * \delta = 4$ |
| 4 | L/2 = 16/2 = 8 | $4 * \delta = 8$ |

Distribution

Once a media clip has been segmented in accordance with the inventive segmentation method as described above, it is then distributed from an origin server, where it resides, to the streaming caches, SCs, which collectively make up the distribution set. According to the inventive distribution method, the segment media clip is distributed in successive distribution rounds wherein an i-th segment of the media clip is distributed from the origin server to each SC in an i-th distribution round. In the i-th round, as each SC receives the i-th segment from the origin server, it decides whether to store or discard the received segment in accordance with a probability which varies in each round. In a first distribution round, each SC stores the first segment (i=1) with probability 1. In a second round (i=2) the second segment is stored with a probability of ½. In general, in an i-th distribution round, the probability of storing the i-th segment at each SC is computed as:

$$\text{Probability of storing the i-th segment} = 1/2^{(i-1)} \tag{6}$$

Figure 2:
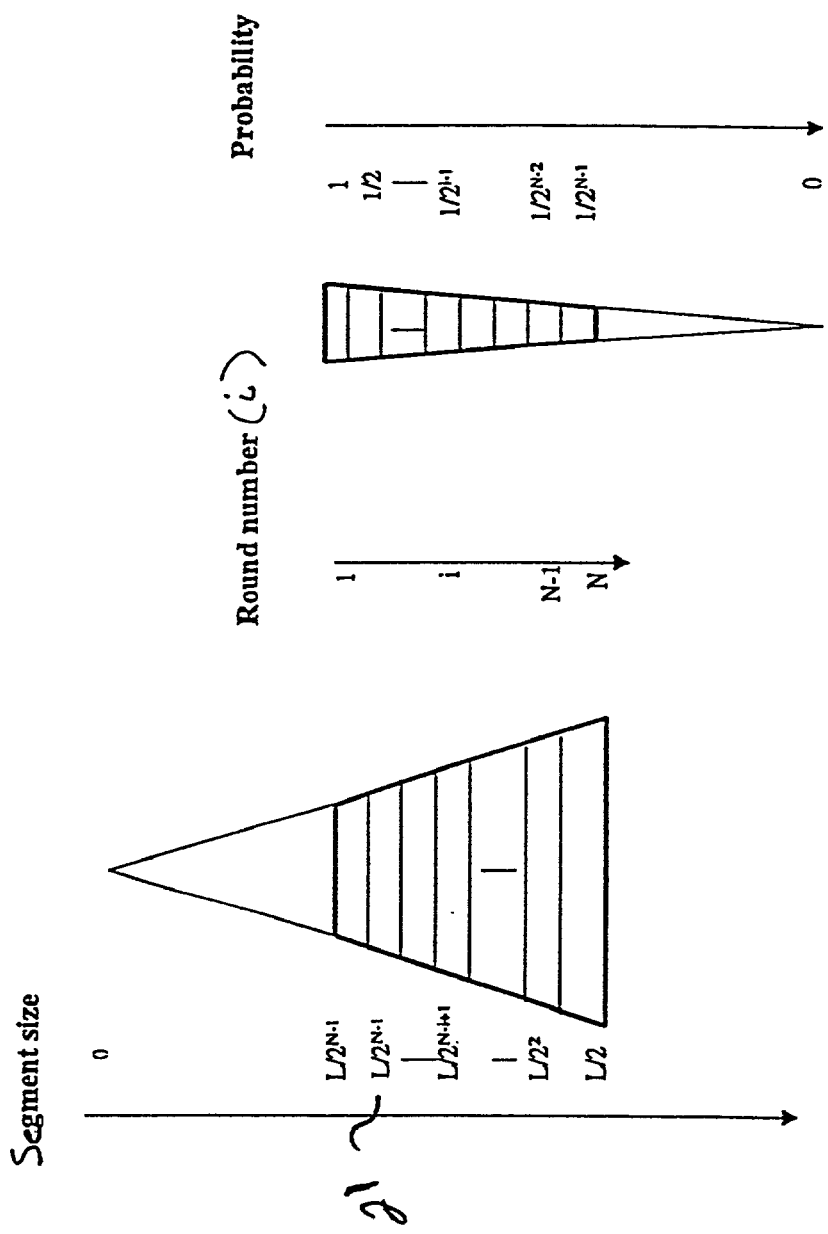
FIG. 2 is an illustration of the segment size/distribution probability variation over N rounds in accordance with an unmodified segmentation/distribution method according to the present invention.

FIG. 2 illustrates the segment size of each segment of the media clip and the associated probability of storing each segment in an i-th round over N rounds. As shown in FIG. 2, the product of segment size and the probability of caching the segment is a constant for all segments beginning with the second segment, which is identified by reference numeral 21.

Table II illustrates the probability variation of storing segments with segment size, the number of SCs storing each segment, and the total storage requirement for each segment of the media clip.

TABLE II

| Segment number | Segment size | Segment size | Probability to cache the segment | Number of SCs (caches) storing the segment | total storage for the segment |
|---|---|---|---|---|---|
| 1 | $\delta$ | $L/2^{N-1}$ | 1 | $K$ | $LK/2^{N-1}$ |
| 2 | $\delta$ | $L/2^{N-1}$ | 1/2 | $K/2$ | $LK/2^N$ |
| 3 | $2\delta$ | $L/2^{N-2}$ | 1/4 | $K/4$ | $LK/2^N$ |
| ... | | | | | |
| i | $2^{i-2}\delta$ | $L/2^{N+1-i}$ | $1/2^{i-1}$ | $K/2^{i-1}$ | $LK/2^N$ |
| ... | | | | | |
| N-2 | $2^{N-4}\delta$ | 1/8 | $1/2^{N-3}$ | $K/2^{N-3}$ | $LK/2^N$ |
| N-1 | $2^{N-3}\delta$ | 1/4 | $1/2^{N-2}$ | $K/2^{N-2}$ | $LK/2^N$ |
| N | $2^{N-2}\delta$ | 1/2 | $1/2^{N-1}$ | $K/2^{N-1}$ | $LK/2^N$ |

The mean storage requirement for the clip in accordance with the distribution method of the present invention is $(N+1)LK/2^N$, which is always less than the storage requirement of the simplistic replication scheme (i.e., $L*K$). A storage efficiency factor, $S_{eff}$, is a measure of the relative efficiency of the storage requirement of the inventive segmentation/distribution method as compared with the simplistic replication scheme. The storage efficiency factor is defined as a ratio of the storage requirements of inventive caching method divided by the simplistic replication scheme (e.g., $L*K$), computed as:

$$S_{eff} = \{(N+1)LK/2^N\}/LK = (N+1)/2^N \tag{7}$$

Equation (7) illustrates that the storage efficiency factor, $S_{eff}$ is always less than 1 when N>1. That is, the inventive distribution scheme will always be more storage efficient than the simple replication scheme when N>1.

As an example of the reduced storage requirements of the inventive distribution method, consider a distribution set comprised of eight streaming caches (i.e., K=8). For a streaming multimedia clip of length L=16, where L is defined in units of time, divided into four segments of exponentially increasing size, the resulting segment sizes are: segment 1=L/8=2, segment 2=L/8=2, segment 3=L/4=4 and segment 4=L/2=8. The four segments are distributed to the SCs in the distribution set, one segment per round, in four successive rounds with an associated distribution probability in each round of: 1, ½, ¼, and ⅛, respectively. Table III illustrates a sample distribution of the segments among the eight SCs in the distribution set.

TABLE III

| | Streaming Caches | | | | | | | |
|---|---|---|---|---|---|---|---|---|
| | SC1 | SC2 | SC3 | SC4 | SC5 | SC6 | SC7 | SC8 |
| segment 1 | Size 2 | Size 2 | Size 2 | Size 2 | Size 2 | Size 2 | Size 2 | Size 2 |
| segment 2 | Size 2 | | Size 2 | | Size 2 | | Size 2 | |
| segment 3 | Size 4 | | | Size 4 | | | | |
| segment 4 | | Size 8 | | | | | | |

Note that the first segment is stored at all the SCs in the network to reduce latency, the second segment is stored at only four of the eight SCs in the distribution set (i.e., SCs 1, 3, 5 and 7), the third segment is stored at only two SCs in the distribution set (i.e., SCs 1 and 4) and the fourth segment is stored at one SC in the distribution set (i.e., SC=2). It is noted that the larger segments (e.g., segments 3 and 4 are stored at fewer SCs in the network as compared with the smaller segments (e.g., segments 1 and 2). That is, smaller sized segments closer to the beginning of the media clip are stored with a higher probability at each SC, and larger sized segments closer to the end of the media clip are stored with a lower probability. As a consequence, later (i.e., larger sized) segments of the media clip are distributed to fewer SCs in the network and earlier segments are distributed to a higher number of SCs in the network. This feature conforms with the manner in which end users request streaming data over a network. When an end user begins stream playback of a media clip, the probability is high that the user will at some point prior to viewing the entire clip abort and browse another media clip or possibly issue a VCR control operation such as fast-forward. However, once the stream playback has progressed for a relatively long period of time, the probability of that user aborting the playback becomes increasingly smaller. This usage pattern suggests that the frequency of requests for segments later in the clip is lower than the request for segments near the beginning of the clip. The lower request for later segments suggests that later segments should be stored at SCs with a lower probability as provided by the inventive distribution method.

The total storage requirement for the illustrative example is computed as:

$$\text{Total storage required} = (N+1)LK/2^N = (4+1)*16*8/2^4 = 40 \quad (9)$$

By comparison the total storage requirement of the simplistic replication scheme is computed as:

$$\text{Total storage required} = L*K = 16*8 = 128 \quad (10)$$

While it has been demonstrated that the inventive caching method provides advantages over the simplistic replication scheme, it is not without drawbacks. One drawback of the inventive caching method as described thus far, is that with exponential increase in the size of successive segments, for ordinary media clips of 2-hr duration, for example, the number of segments can be very small. For example, for an initial segment size on the order of 2 sec., a 2.3 hour Media clip would require only eight segments. Also, for a small number of SCs, there is a rapid drop in caching probability for the higher numbered segments which can leave "holes" in the distributed layout in an effort to save space. A hole is defined as a segment not stored at any of the SCs in the distribution set.

Another drawback of the inventive distribution method as described is that it can create a load imbalance. That is, certain SCs which store mostly longer segments may be overloaded when other SCs that store shorter segments are idle. This is especially true in the case where all the requests for a certain media clip are from beginning to end, and the requests are issued closely in time.

A further drawback is that the SCs which store smaller segments may see lower storage capacity utilization. As a corollary, for those SCs which store larger segments, replacement policies may be required to force out larger segments to accommodate more clips thereby resulting in clip holes or thrashing in the storage system.

To overcome the above deficiencies the inventive caching method is further modified. In the modified invention caching method, the inventive segmentation method described above in which segments increase in size exponentially and are distributed with a probability that is inversely proportional to the size of the segment, is performed as described above until a point is reached at which the size of a segment meets or exceeds a predetermined segment size. At that point, the distribution method is aborted in favor of a modified distribution method in which further segments are created of fixed size and are distributed with a constant probability distribution.

Table IV illustrates the segment size variation and corresponding caching probability variation for the modified distribution method. The initial segment size for round 1 is set to a small fraction of the entire clip as described in the non-modified case.

TABLE IV

| Segment Index I | Segment Size | Probability Of caching the Segment | Number of Streaming Caches (SCs) storing the segment | Total storage for Segment I |
|---|---|---|---|---|
| 1 | $\delta$ | 1 | K | $\delta K$ |
| 2 | $\delta$ | 1/2 | K/2 | $\delta/K2$ |
| 3 | $2\delta$ | 1/4 | K/4 | $\delta/K2$ |
| ... | | | | |
| m | $2^{m-2}\delta$ | $1/2^{m-1}$ | $K/2^{m-1}$ | $\delta/K2$ |
| m + 1 | $2^{r-1}\delta$ | $1/2^r$ | $K/2^r$ | $\delta/K2$ |
| m + 2 | $2^{r-1}\delta$ | $1/2^r$ | $K/2^r$ | $\delta/K2$ |
| ... | | | | |
| m + R | $2^{r-1}\delta$ | $1/2^r$ | $K/2^r$ | $\delta/K2$ |

Table IV illustrates that at round i=m, the demarcation point between the original and the modified distribution method, the segment size reaches a threshold value of $2^{m-2}\delta$. In one embodiment, from the point at which the segment size reaches the threshold value, the segment size is held constant at $2^{r-1}\delta$ for all remaining segments, and the caching probability is fixed at $1/2^r$.

Note that the sum of the size of the first little m segments is $\delta+\delta+2\delta+4\delta+\ldots+2^{m-2}\delta$ which is equal to $2^{m-1}\delta$, and after round m, all of the segments are of the same size which is equal to $2^{r-1}\delta$. Given that the length of the entire clip equals L, the number of rounds needed for the bottom half of the generalized silo shape, as illustrated in FIG. 3 and Table 3, is defined by $R=(L-2^{m-1}\delta)/(2^{r-1}\delta)$.

Figure 3:
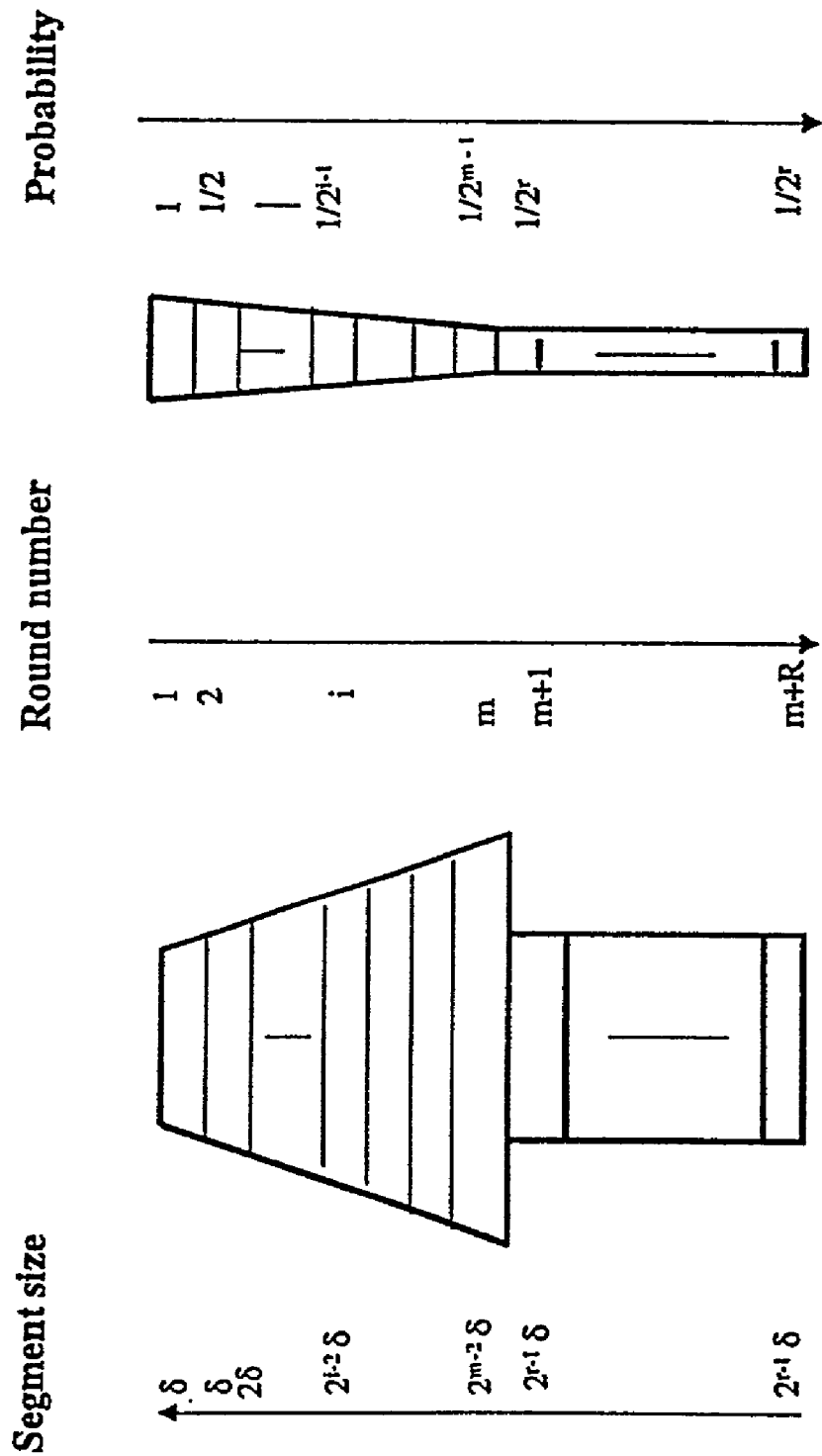
FIG. 3 is an illustration of the segment size/distribution probability variation over N rounds in accordance with a modified distribution method according to one embodiment of the present invention.
Figure 4:
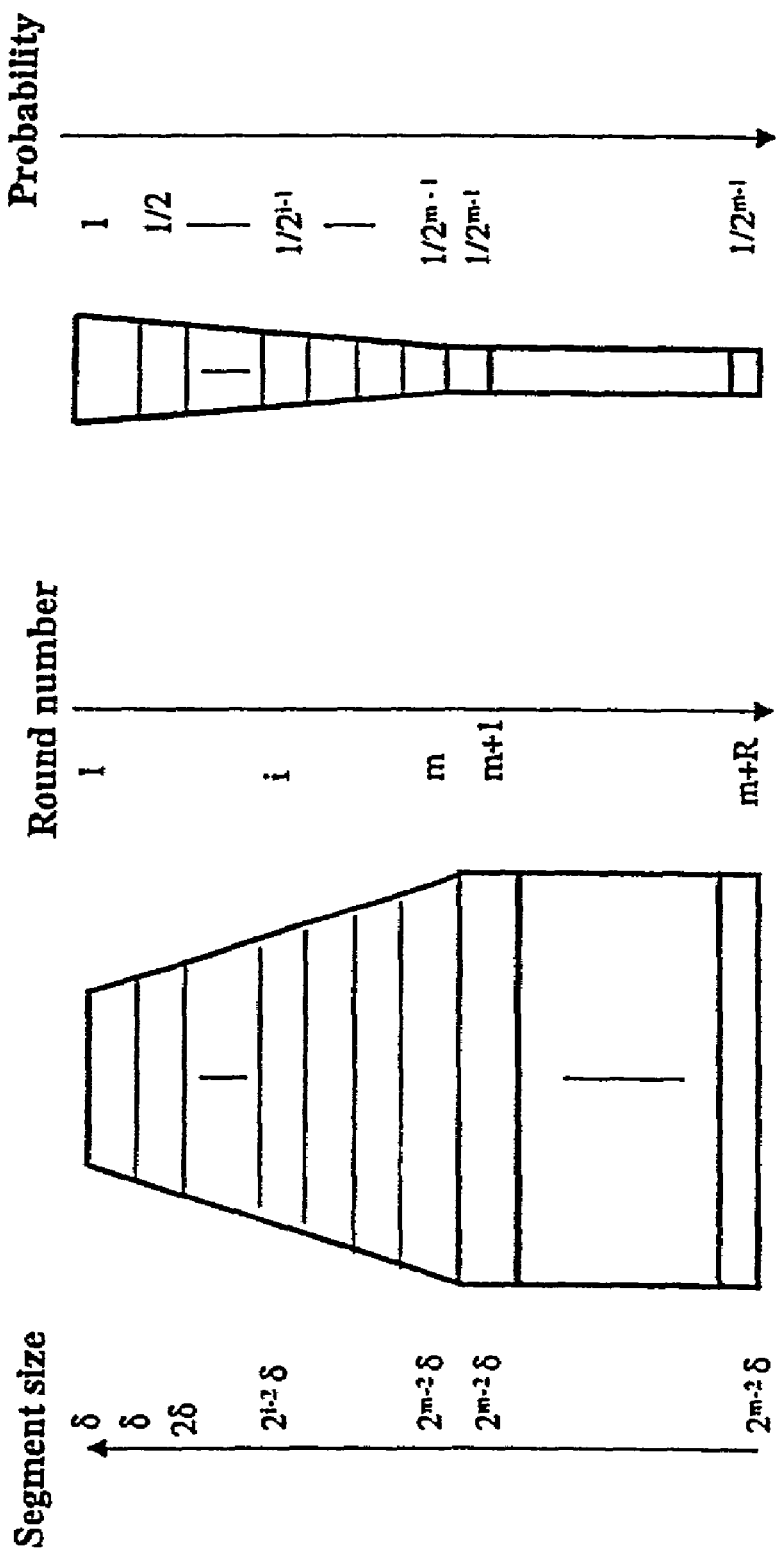
FIG. 4 is an illustration of the segment size/distribution probability variation over N rounds in accordance with a modified distribution method according to the present invention.

FIGS. 3 and 4 illustrate, two alternative embodiments for distributing the remainder of the media clip when the threshold segment size is reached. In a first embodiment, as illustrated in FIG. 3, and described above, the segment size is held constant at $2^{r-1}\delta$, and the caching probability is fixed at a predetermined value, i.e., $1/2^r$ in the (m+1)th round and all subsequent distribution rounds. In the second embodiment, the segment size and caching probability remain fixed at the segment size values established in the m-th distribution round.

Performing the inventive segmentation/distribution method includes determining values for three parameters ($\delta$, m and r), where $\delta$ is the initial segment size; m is the last round in which the segment size increases exponentially; and r determines the constant segment size after round m. The three values can be determined directly from the origin server in the case of the Origin Server Aware (OSA) model or via the inter-cache communication in the case of the Origin Server Transparent (OST) scheme. In either case, the parameter values are consistent across all SCs in the distribution set.

With respect to the first parameter, the initial segment size, $\delta$, must be long enough to allow the client to start the prefetch pipeline for subsequent segments. An initial segment size for $\delta$, on the order of 5 to 30 seconds is sufficient for most network conditions. For an MPEG-2 stream of 5 Mbps average bandwidth, this results in a prefetch buffer of roughly 3–18 MB. Clearly, a smaller $\delta$ is desirable to minimize the playout buffer.

As described to this point, the first segmentation/distribution method (i.e., exponential increase in the segments) is aborted in an m-th round. For example, for $\delta=3$ MB, as the initial segment size, in round i=8 the segment size is equal to $2^{i-2}\delta=192$ MB. Note that the segment size is doubled before reaching the m-th round. As shown, in actual operation the increase in segment size may be too rapid and a smaller exponent between 1 and 2 should be used. The segment size for rounds starting at (m+1) is $2^{r-1}*\delta$. The maximum segment size in the layout occurs at round m, which equals $2^{m-2}\delta$, and the minimum segment size occurs at the $1^{st}$ round which equals $\delta$, therefore $1<r<m$ should be the guideline for choosing r.

Multiple Clips

In a fictitious situation in which there are multiple media clips, and all the clips are equally popular, each clip can be segmented in the same manner using identical values of the parameter set ($\delta$, m, r) for each media clip. The inventive caching method guarantees that for each clip, the mean storage requirement for a segment in the caching system is the same. If each media clip in the system has the same length and the same bandwidth requirement, the mean storage requirement for a segment as well as the entire clip is the same. However, not every media clip has the same popularity among all clients. More practically, the caching system needs to rank media clips according to their popularity and allocate more storage for popular clips.

As discussed above, to account for the popularity of segments within a clip, the inventive caching method caches popular segments of the clips with higher probability. As such, the more popular segments occupy more storage in the system as compared with less popular segments of the same size. In particular, the probability to cache segment 1 is 1, to cache segment 2, ½, segment 3, ¼, ... segment m, $½^{(m-1)}$, and after segment m, the probability is $½^r$.

Applying this popularity principle for multiple clips, it is natural to extend the scheme in such a way that clips with the highest GCHR should be assigned the following caching probability sequence:

$$U=(1, ½, ¼, \ldots ½^{(m-1)}, ½^r, \ldots ½^r) \quad (15)$$

Where each respective element defines the caching probability of a respective segment of the media clip.

Clips with lower GCHR should be assigned a probability sequence that is proportionally lower than U. In general, the probability sequence for a clip with GCHR x is:

$$e(x)U \quad (16)$$

where $0 \leq e(x) \leq 1$.

Equation (16) is referred to as the caching ratio, which is the normalized GCHR between 0 and 1.

Replacement Algorithm

Another aspect of the inventive caching system of the present invention concerns replacing existing segments of a media clip at each SC in the distribution set. The replacement algorithm for the inventive caching system of the present invention ensures that an SC can efficiently store future streams (i.e., the scalability). The state of the caching system is considered efficient if the number of copies of a data segment in the caching system is directly proportional to its popularity. A replacement method is described below which accounts for the Clip Hotness Rating (CHR) and the Segment Hotness Rating (SHR), metrics defined above.

It is assumed that all client requests are for clips from their beginning and clients can terminate the requests anytime before the end of the clip is reached. This implies that within a clip, segments close to the beginning of clip are more popular than segments close to the end.

Each SC records the Global Clip Hotness Rating (GCHR) of each media clip and stores clips in an ordered list in decreasing GCHR. Because GCHR for a clip is the same across all SCs, the ranking of clips at each SC is the same.

Figure 5:
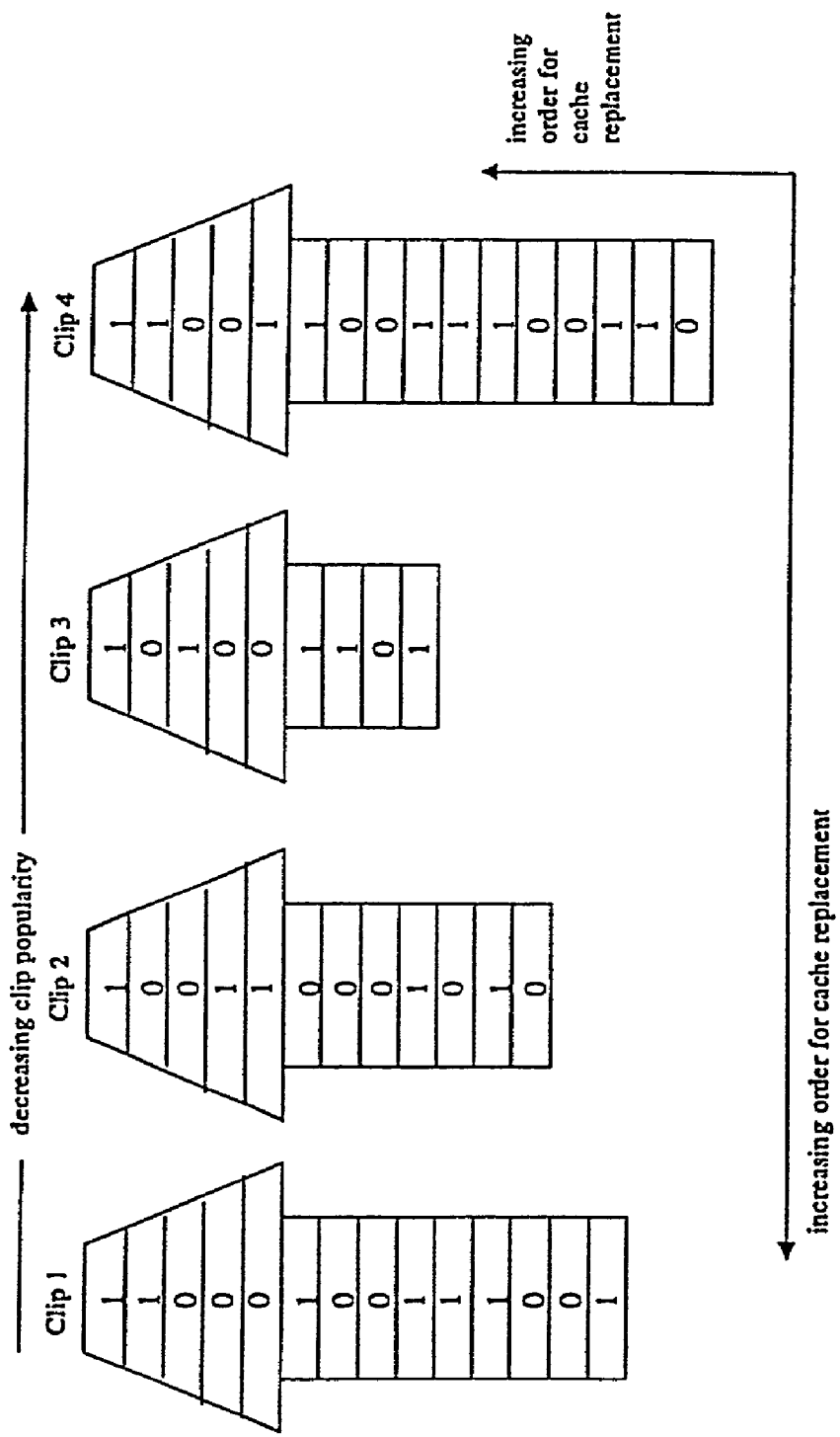
FIG. 5 is an illustration of a global view of the state of a plurality of clips stored at a representative streaming cache in accordance with the inventive caching system.

FIG. 5 is an illustration of a global view of the state of a plurality of clips stored at a representative streaming cache, SC, in accordance with the inventive caching system. As discussed above, the segments of each clip are stored at different SCs in the distribution set and not every segment is present at each SC. A local view, as provided by FIG. 5, of the storage status of the segments provides that each clip stored at an SC is obtained by accounting presence or absence of segments. In FIG. 5, the presence of each segment in a clip at an SC is represented by a "1", and an absence by a "0".

Each SC independently executes the cache replacement method. Two important observations with regard to the inventive replacement method are: (1) Since the GCHR of the media clip reflects its popularity, clips with low ratings should be replaced first; and (2) within a clip, data segments have decreasing popularity as their time stamps increase, therefore segments within a clip should be replaced starting from the end of the clip. It is a primary objective of the replacement method to keep more popular clips in the cache.

The inventive replacement method, according to one embodiment, can be stated as follows. During replacement if the GCHR of a clip is lower than some predefined GCHR threshold (i.e., alpha), complete removal of the clip is warranted. However, once a clip meets or exceeds the alpha threshold, a clip should not be completely removed, instead, it is preferred to replace segments of all stored clips from their end. Therefore the inventive replacement algorithm at each SC proceeds in two phases to create space for new segments: In a first phase, the clip with the lowest GCHR is dropped segment-by-segment from its end. This process repeats for one or more clips until the associated GCHR rating for all remaining clips meets or exceeds the predetermined GCHR threshold value, alpha. If still more disk space is needed at this point, the algorithm enters a second phase where the clip with the lowest rating is chosen and its segments are flushed from the clip's end until a second threshold (Beta) of the clip is left. Then the flushing process moves to the clip with the second lowest rating.

The replacement algorithm described above is not without drawbacks. First, it is hard to find an optimal set of values for the alpha and beta parameters. Furthermore, it is not scalable in the sense that a set of optimal values for a specific cache configuration may not be an optimal set of values for a different cache configuration. The algorithm's performance is highly dependent on the values of the two parameters (alpha, beta). If the value of alpha is too small, then later segments of more popular clips are removed from the cache while earlier segments of much less popular clips remain in the cache. If the value of beta is too small or too large, there could be similar problems of inappropriate ordering of segment replacement. Thus, the values of alpha and beta should be carefully determined based on the total size of the clip database and the size of each proxy cache.

Referring to FIG. 5, another drawback of the replacement method is that, with respect to the region determined by the alpha parameter, it always gives higher priority to the later segments of more popular clips than earlier segments of less popular clips, which may not always be true. With regard to the region determined by the beta parameter, the early segments of less popular clips always have higher priority than the later segments of even the most popular clip. As such, the algorithm lacks a capability to keep proper ordering among segments of different clips, while maintaining proper ordering among segments within a clip.

The drawbacks associated with the replacement method described above are addressed by a second embodiment. In the second embodiment, the two-dimensional structure (i.e., alpha/beta) described in the previous embodiment is discarded in favor of a one-dimensional ordering that is based on both clip popularity and user playback time behavior. In accordance with this embodiment, each segment is assigned a probability that the segment will be accessed when a user request for a clip playback arrives. The higher the probability, the higher the potential that the segment is requested for playback. The probability is computed as a potential function where the rank defines a range of GCHR values and rank increases with increasing GCHR. In general, a higher rank implies a lower rank value. For example, a clip with rank 5 has a higher probability of access than a clip with rank 10. However, the potential function takes into account not only the clip but also considers the location of the segment within the clip. This dual consideration is taken into account by equation (17) by considering the multiplication of two terms, defined as:

$$F(i,j) = \text{Prob (selecting a clip with rank } i) * \text{Prob (selecting segment } j \text{ of the clip)} \quad (17)$$

Equation (17), represents the probability that a segment j of a clip with rank i is accessed when a user request for a clip playback arrives. The potential function successfully captures both inter-clip and intra-clip orderings of importance to provide a good one-dimensional ordering of replacement. The potential function, F(i,j), is computed for each segment in the cache after which all segments are coarsely sorted in decreasing order of potential into a plurality of bands where each band defines a segment range defined by a lower and an upper potential function boundary value.

A course band sorting is preferred over an exact sorting of segments thereby conserving computing resources in the sort operation. Accordingly, the sorting operation includes quantizing the computed potential function for each segment to determine which band it is to be included in. It is contemplated that the quantization can either be linear or non-linear. For example, logarithms represent one form of non-linear quantization. Non-linear quantization can provide more flexibility by sub-dividing the lower potential regions with finer granularity and the higher potential region with a more coarse granularity. As an alternative, linear quantization provides simplicity.

In accordance with the replacement method of the present embodiment, where it is determined that a new segment is required to be cached locally and there is insufficient cache space at that time, the replacement method attempts to replace segments with lower potential first.

Figure 6A:
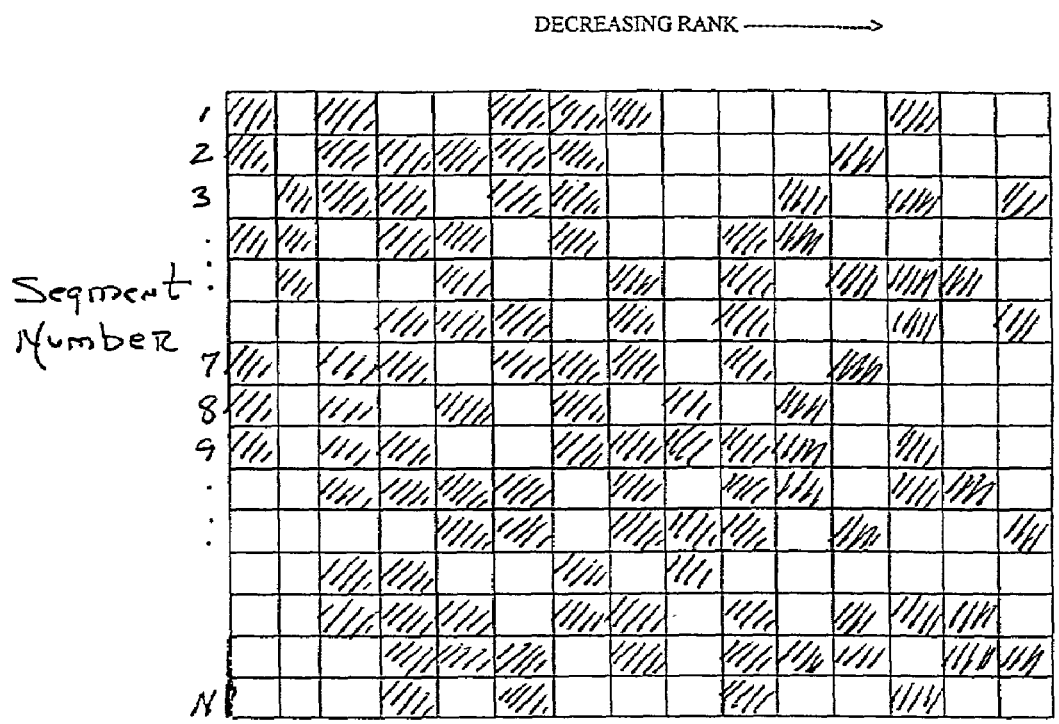
FIG. 6a is an illustration of a typical SC local cache storing a plurality of clips.

FIG. 6a illustrates a typical SC local cache storing a plurality of clips. As indicated in the figure, clips are arranged in decreasing rank order from left to right in each column. In each column, the SC may store less than the total number of segments for the clip. This is illustrated in FIG. 6a. at column 1, where only segments 1, 2, 4, 7, 8 and 9 are stored at the SC for the clip having the highest GCHR value. Further, as indicate at column 2, the clip having the next highest GCHR value stores only segments 3, 4 and 5. It is noted that each square of the matrix represents only the potential function of a segment and not its size.

Figure 6B:
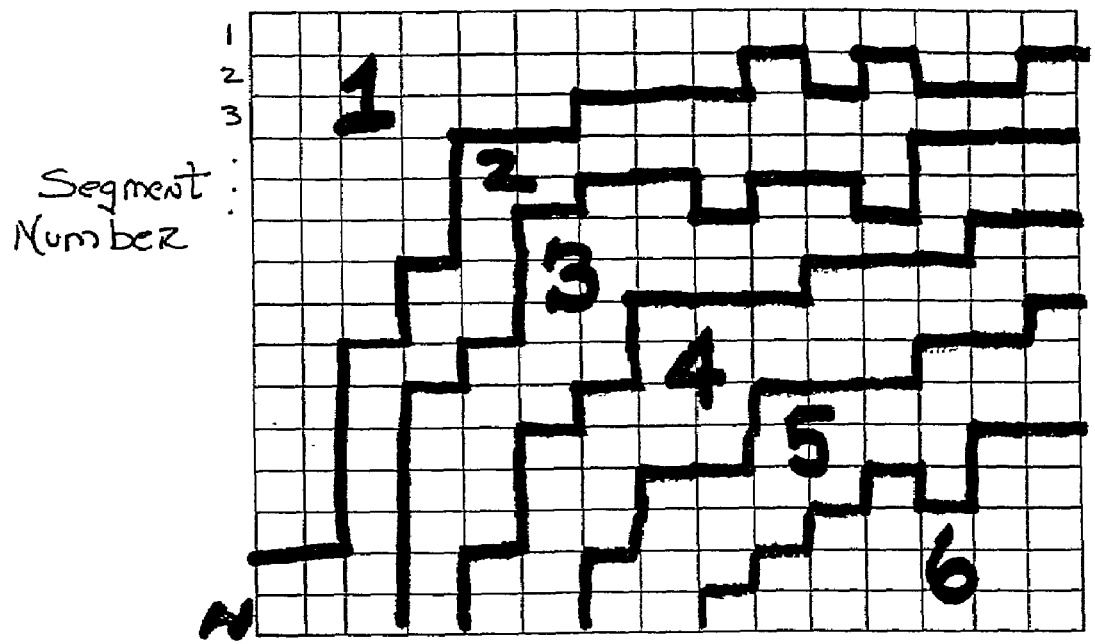
FIG. 6b is an illustration of a typical SC for removing segments from the SC when space is needed to store new segments.

FIG. 6b illustrates the present embodiment for removing segments from the SC when space is needed to store new segments. The potential function is computed for each segment illustrated in FIG. 6a using equation (17). From the computed values, bands 1–6 are defined where each band defines a range of values of the potential function. Referring to equation (17), the first term, i.e., the probability of selecting a clip with rank i, decreases with decreasing rank, and the second term, i.e., probability of selecting segment j of the clip, decreases with segment number. Therefore, the potential function values computed in band 1 are greater than the potential values computed in band 2 and so on. Accordingly, in FIG. 6b, the segments in band 6 will be replaced before the segments in band 5 and so on.

As an example of the replacement method of the present invention according to the present embodiment, consider the case where a new segment must be cached locally and there is not enough space for the segment in the SC. The replacement method of the present embodiment attempts to replace those segments cached in the higher numbered bands first until a point is reached whereby the next segment to be replaced has an associated band number lower than the band number of the new segment.

If enough victim segments are located for replacement with the new segment, the method caches the new segment and replaces out of victim segment(s). Otherwise, the new segment cannot be cached locally.

The replacement method according to the present embodiment provides a good one-dimensional ordering of replacement, combining both dimensions of the previous embodiment in a novel manner. Also, unlike the previous replacement embodiment (i.e., alpha/beta algorithm), it has no control parameters that can seriously affect performance of the cache replacement algorithm. Further it is fully scalable in a sense that it can seamlessly work under various configurations.

While the present invention has been shown and described in detail with reference to the preferred embodiments, they represent mere exemplary applications. Thus, it is to be clearly understood that many variations can be made by anyone having ordinary skill in the art while staying within the spirit and scope of the present invention as the appended claims.

What is claimed is:

1. In a network, a method for segmenting a streaming multimedia clip and distributing said streaming multimedia clip from an origin server to a plurality of streaming caches which comprise a distribution set in said network, the method comprising the steps of:
   determining a size (L) of the multimedia clip;
   segmenting the streaming multimedia clip into a first plurality of data segments of exponentially increasing size, wherein a segment size of a k-th data segment in the first plurality of data segments is computed using the size of the multimedia clip and a total number of data segments in the first plurality of data segments;
   dividing a remaining undivided portion of said multimedia clip into a second plurality of data segments having a predetermined segment size; and
   distributing the first and second pluralities of data segments from the origin server to said plurality of streaming caches, wherein an i-th data segment is distributed in an i-th distribution round to each of said plurality of streaming caches.

2. The method according to claim 1, wherein the segment size of the k-th data segment in the first plurality of data segments is computed as $L/2^{(K-k+1)}$,
   where K is the total number of data segments in the first plurality of data segments, and
   where k is an index defining each of the K data segments, (k=1, 2, ..., K), in the first plurality of data segments.

3. The method according to claim 1, wherein the size L of the multimedia clip is measured in units of time.

4. The method according to claim 1, wherein the segmenting and dividing steps further comprise the steps of:
   determining in an m-th segmenting round if a data segment of the first plurality of data segments is equal to or greater than a predetermined threshold value, said m-th data segment referred to as a threshold data segment; and
   dividing the remaining undivided portion of said multimedia clip into the second plurality of data segments if the data segment of said multimedia clip is equal to or greater than the predetermined threshold value.

5. The method according to claim 4, wherein said remaining undivided portion is divided into data segments in successive rounds having an index m+1 through N, where N is a total number of data segments of the first plurality of data segments and the second plurality of data segments.

6. The method according to claim 4, wherein the predetermined segment size is equal to the size of the threshold data segment.

7. The method according to claim 4, wherein the predetermined segment size is computed as:

$$2^{(r-1)} * \delta$$

where $\delta$ is computed as $L/2^{(N-1)}$; and where r is a user adjustable parameter used to determine the predetermined segment size for those fixed segments which occur once the predetermined threshold has been reached.

8. The method according to claim 7, wherein $\delta$ is on the order of 5 to 30 seconds.

9. The method according to claim 7, wherein the values for $\delta$, r and m are determined by an origin server in accordance with an origin server aware scheme.

10. The method according to claim 7, wherein the values for $\delta$, r and m are determined by inter-cache communications in an origin server transparent scheme.

11. The method of claim 1, wherein the distributing step further comprises the step of:

at each of the plurality of streaming caches, storing an i-th data segment of the first plurality of data segments in an i-th distribution round with a probability equal to $\frac{1}{2}^{(i-1)}$, where (i=1, ..., k); and at each of said plurality of streaming caches, storing an i-th data segment of the second plurality of data segments in an i-th distribution round with probability equal to a predetermined probability, where (i=k+1, ..., N).

12. A method of distributing a segmented streaming multimedia clip among a plurality of streaming caches, comprising the steps of:

at each of said streaming caches:

receiving a plurality of data segments of the segmented streaming media clip, wherein the plurality of data segments comprises a first plurality of data segments of exponentially increasing size and a second plurality of data segments having a predetermined segment size, wherein an i-th data segment is received in an i-th distribution round, wherein a segment size of a k-th data segment in the first plurality of data segments is computed using the size of the multimedia clip and a total number of data segments in the first plurality of data segments;

storing the i-th data segment of the segmented streaming multimedia clip in the i-th distribution round with a probability proportional to $\frac{1}{2}^{(i-1)}$, where the i-th data segment is associated with the first plurality of data segments; and storing the i-th data segment of the segmented streaming multimedia clip in the i-th distribution round with a fixed probability where the i-th data segment is associated with the second plurality of data segments.

13. The method according to claim 12, further comprising the step of:

storing the i-th data segment of said segmented streaming multimedia clip with probability equal to $[\frac{1}{2}^{(i-1)}] * e(x)$, where the i-th data segment is associated with the first plurality of data segments, where $e(x)$ is a constant that is proportional to a popularity rating of the clip, where $0 < e(x) < 1$.

14. A system for segmenting, distributing and replacing segments of streaming multimedia clips in a network, comprising:

at least one origin server storing said streaming multimedia clips;

a plurality of streaming caches in communication with said at least one origin server, said plurality of streaming caches defining a distribution set;

first processing means associated with said at least one origin server for segmenting the streaming multimedia clip into a first plurality of data segments of exponentially increasing size and a second plurality of data segments having a predetermined segment size, wherein a segment size of a k-th data segment in the first plurality of data segments is computed using the size of the multimedia clip and a total number of data segments in the first plurality of data segments, and for distributing said first and second pluralities of data segments to each of said plurality of streaming caches; and second processing means associated with each of said plurality of streaming caches for storing data segments received from said at least one origin server in each of said plurality of streaming caches and for replacing said stored data segments from each of said plurality of streaming caches.

15. The system of claim 14, wherein said second processing means further comprises:

means for computing a potential function for each stored data segment for replacing segments.

16. The system of claim 14, wherein said second processing means further comprises:

means for computing a probability to determine whether to store or discard each data segment received from said at least one origin server.

* * * * *